United States Patent Office 3,359,280
Patented Dec. 19, 1967

---

3,359,280
KETALS OF 5-ALKANOYL-A-NORANDROSTANE-2-ONES
Seymour D. Levine, Princeton, N.J., assignor, by mesne assignments, to E. R. Squibb & Sons, Inc., New York, N.Y., a corporation of Delaware
No Drawing. Original application Aug. 30, 1965, Ser. No. 483,790, now Patent No. 3,296,300, dated Jan. 3, 1967. Divided and this application Oct. 31, 1966, Ser. No. 608,240
6 Claims. (Cl. 260—340.9)

ABSTRACT OF THE DISCLOSURE

This invention relates to new ketals of 5-alkanoyl-17-oxygenated-A-norandrostane-2-ones. These compounds are useful as intermediates in the preparation of the corresponding 5-alkanoyl-17-oxygenated-A-norandrostane-2-ones to which they are converted by hydrolyzing off the ketal group.

---

This application is a division of my application, Ser. No. 483,790, filed Aug. 30, 1965, and now U.S. Patent No. 3,296,300, granted Jan. 3, 1967.

This invention relates to new steroidal compounds and, more particularly, to new steroids of the A-norandrostane series, new intermediates useful in the preparation of the same, and processes for preparing the same.

The new final products of this invention are of the Formula I:

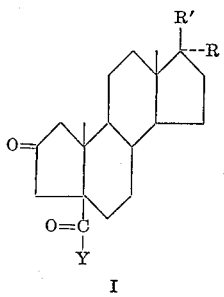

wherein Y is lower alkyl; R is hydrogen or lower alkyl; R' is hydroxy or acyloxy; or together R and R' is oxo. Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cycloalkane carboxylic acids, the cycloalkene carboxylic acids, the monocyclic aromatic carboxylic acids (e.g., benzoic acids), and the monocyclic aryl(lower alkanoic) acids (e.g., phenacetic and β-phenylpropionic acid).

The final products of this invention are physiologically active compounds that possess fertility inhibiting activity. Hence, they may be administered orally or parenterally in lieu of known anti-fertility agents, such as progestagens and estrogens for control of conception, the dose being adjusted for the activity of the particular compound. They also possess antiandrogenic activity.

The compounds of this invention are prepared by interacting a compound of the Formula II:

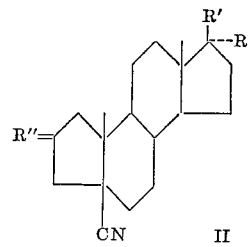

wherein R and R' are as hereinbefore defined and R" is ketal, with a compound of the formula: YX, wherein Y is as hereinbefore defined, and X is an activating group such as magnesium bromide, lithium or a complex thereof (e.g., a lithium ethylenediamine complex). Although any ketal may be used, the preferred ketals are those with alkanediols, such as ethylene glycol and propylene glycol. The compounds of Formula II can be prepared as described in U.S. patent application, Ser. No. 440,311, filed Mar. 16, 1965, and now Patent No. 3,330,851. The reaction is preferably carried out at an elevated temperature, such as the reflux temperature of the reaction medium.

The nature of the product formed depends on both the specific steroid reactant and the reaction conditions. Thus, if the reaction is carried out at the pH of the reaction mixture (alkaline) and an acid is added subsequently at ambient temperature, the 2-ketal group is retained, which can be later hydrolyzed to yield the final products. If, however, an acid, such as a mineral acid (e.g., hydrochloric acid) is subsequently added and the reaction medium heated, as to reflux, then the 2-ketal group is hydrolyzed and a 2-ketone is formed directly.

If a compound wherein R is hydrogen or lower alkyl is used, the correspondingly 17-unsubstituted product is formed. If, however, a 17-keto steroid is used, the 17-ketone enters into the reaction and is converted to a 17β-hydroxy-17α-Y derivative, wherein Y is a lower alkyl corresponding to the lower alkyl used in the YX reactant. To prepare the 17β-esters when R=H, the corresponding 17β-hydroxy products are acylated in the usual manner, as by treating with an acyl halide or acid anhydride in the presence of a tertiary base, such as pyridine. To prepare the 17β-esters when R=lower alkyl the acylation is carried out in the presence of perchloric acid. The preferred acylating agents are the acyl chlorides and acid anhydrides of a hydrocarbon carboxylic acid of less than twelve carbon atoms. To prepare the 17-keto steroids, the 17β-hydroxy steroid is oxidized in the usual manner, as by treatment with chromium trioxide.

The following examples illustrate the invention (all temperatures being in centigrade):

*Example 1.—5β-acetyl-17α-methyl-A-norandrostane-2-one-17β-ol 2-ethylene ketal*

A solution of 200 mg. of 5β-cyano-A-norandrostane-2,17-dione 2-ethylene ketal in 9 ml. of ether and 9 ml. of benzene is treated with 3 ml. of a 5.25% methyllithium in ether solution. The reaction mixture is refluxed for 4 hours, treated with methanol and hydrochloric acid and the organic layer separated. The aqueous phase is extracted with chloroform. The combined extracts are washed with a saturated sodium bicarbonate solution, 8% salt solution, dried over sodium sulfate and evaporated to dryness. Plate chromatography of the residue using neutral alumina (Activity V) as the adsorbent and chloroform as the developing solvent gives a major band detectable with iodine. Elution with ethyl acetate gives a residue which is crystallized from isopropyl ether-petroleum ether to give 48 mg. of 5β-acetyl-17α-methyl-A-norandrostane-2-one-17β-ol 2-ethylene ketal having a melting point aout 134–136°. The analytical sample is prepared by recrystallization from ether, M.P. about 140.5–142.5°; $[\alpha]_D^{27}+26°$ (CHCl$_3$); $\lambda^{KBr}$ 2.93 and 5.92μ;

$\tau_{CDCl_3}^{TMS}$ 9.13 (s, 18–Me), 9.06 (s, 19–Me), 8.76 (s, 17α–Me), 7.88 (s, 5β—CH$_3$——)

and 6.03 (s, 2-ethylene ketal)

*Analysis.*—Calcd. for C$_{23}$H$_{36}$O$_4$ (316.52): C, 73.36; H, 9.64. Found: C, 73.42; H, 9.66.

*Example 2.—5β-acetyl-A-norandrostane-2-one-17β-ol 2-ethylene ketal*

Following the procedure in Example 1 but substituting 5β-cyano-A-norandrostane-2-one-17β-ol 2-ethylene ketal for 5β-cyano-A-norandrostane-2,17-dione 2-ethylene ketal there is obtained 5β-acetyl-A-norandrostane-2-one-17β-ol 2-ethylene ketal.

*Example 3.—5β-acetyl-17α-methyl-A-norandrostane-2-one-17β-ol*

A. A solution of 500 mg. of 5β-cyano-A-norandrostane-2,17-dione 2-ethylene ketal in 10 ml. of ether and 15 ml. of benzene is treated with 7.5 ml. of a 5.25% methyllithium in ether solution. The reaction mixture is refluxed for 8 hours and then left at room temperature for 8 hours, treated with methanol and acidified with hydrochloric acid. The reaction mixture is refluxed for 1 hour and the organic layer separated. The aqueous phase is extracted with chloroform. The combined extracts are washed with a saturated sodium bicarbonate solution, 8% salt solution, dried over sodium sulfate and evaporated to dryness. Plate chromatography of the residue using neutral alumina (Activity V) as the absorbent and chloroform as the developing solvent gives a major band detectable with iodine. Elution with ethyl acetate gives a residue which is crystallized from acetone-hexane to give 148 mg. of 5β-acetyl-17α-methyl-A-norandrostane-2 - one - 17β - ol having a melting point about 176–178°.

The analytical sample is prepared by recrystallization from acetone-hexane, M.P. about 176–178°; $[\alpha]_D^{27}$ −19° (CHCl$_3$); $\lambda^{KBr}$ 2.82, 5.74 and 5.94μ;

$\tau_{CDCl_3}^{TMS}$ 9.11 (s, 18–Me), 8.92 (s, 19–Me), 8.79 (s, 17α–Me) and 7.75 (s, 5β—CH$_3$——)

*Analysis.*—Calcd. for C$_{21}$H$_{32}$O$_3$ (332.47): C, 75.86; H, 9.70. Found: C, 75.96; H, 9.62.

B. A solution of 150 mg. of 5β-acetyl-17α-methyl-A-norandrostane-2-one-17β-ol 2-ethylene ketal and 15 mg. of p-toluenesulfonic acid in 2 ml. of water and 20 ml. of acetone is refluxed for 14 hours. The reaction mixture is concentrated, diluted with water and extracted with chloroform. The chloroform extracts are washed with 8% salt solution, dried over sodium sulfate, and evaporated to dryness to give 5β-acetyl-17α-methyl-A-norandrostane-2-one-17β-ol.

*Example 4.—5β-acetyl-A-norandrostane-2-one-17β-ol*

Following the procedure in Example 3 but substituting 5β-cyano-A-norandrostane-2-one-17β-ol 2-ethylene ketal for 5β-cyano-A-norandrostane-2,17-dione-2-ethylene ketal in part A there is obtained 5β-acetyl-A-norandrostane-2-one-17β-ol which is also obtained by substituting 5β-acetyl-A-norandrostane-2-one-17β-ol 2-ethylene ketal for 5β-acetyl-17α-methyl-A-norandrostane-2-one-17β-ol 2-ethylene ketal in part B.

*Example 5.—5β-acetyl-17α-methyl-A-norandrostane-2-one-17β-ol 2-ethylene ketal 17-acetate*

A solution of 0.0033 ml. of perchloric acid in 0.3 ml. of acetic anhydride is added to 500 mg. of 5β-acetyl-17α-methyl-A-norandrostane-2-one-17β-ol 2-ethylene ketal in 10 ml. of acetic anhydride. The reaction mixture is stirred at room temperature for 30 min. and then poured into ice-water and extracted with chloroform. The chloroform extracts are washed with a saturated sodium bicarbonate solution, 8% salt solution, dried over sodium sulfate and evaporated to dryness to give 5β-acetyl-17α-methyl-A-norandrostane-2-one-17β-ol 2-ethylene ketal 17-acetate.

*Example 6.—5β-acetyl-17α-methyl-A-norandrostane-2-one-17β-ol 17-acetate*

Following the procedure in Example 5 but substituting 5β-acetyl-17α-methyl-A-norandrostane - 2 - one-17β-ol for 5β-acetyl-17α-methyl-A-norandrostane - 2 - one - 17β-ol 2-ethylene ketal there is obtained 5β-acetyl-17α-methyl-A-norandrostane-2-one-17β-ol 17-acetate.

*Example 7.—5β-acetyl-A-norandrostane-2-one-17β-ol 2-ethylene ketal 17-acetate*

A mixture of 100 mg. of 5β-acetyl-A-norandrostane-2-one-17β-ol 2-ethylene ketal in 1 ml. of acetic anhydride and 2 ml. of pyridine is left at room temperature for 4 hours, diluted with water and extracted with ether. The ether extracts are washed with a saturated sodium bicarbonate solution, 8% salt solution, dried over sodium sulfate and evaporated to dryness to give 5β-acetyl-A-norandrostane-2-one-17β-ol 2-ethylene ketal 17-acetate.

*Example 8.—5β-acetyl-A-norandrostane-2-one-17β-ol 17-acetate*

Following the procedure in Example 7 but substituting 5β-acetyl-A-norandrostane-2-one-17β-ol for 5β-acetyl-A-norandrostane-2-one-17β-ol 2-ethylene ketal there is obtained 5β-acetyl-A-norandrostane-2-one-17β-ol 17-acetate.

*Example 9.—5β-acetyl-A-norandrostane-2,17-dione 2-ethylene ketal*

A solution of 100 mg. of 5β-acetyl-A-norandrostane-2-one-17β-ol 2-ethylene ketal in 10 ml. of acetone is treated dropwise with an equivalent amount of chromium trioxide-sulfuric acid. The chromic sulfate is removed by filtration and washed with additional acetone. The filtrate is concentrated, diluted with water and extracted with chloroform. The chloroform extracts are washed with 8% salt solution, dried over sodium sulfate and evaporated to dryness to give 5β-acetyl-A-norandrostane-2,17-dione 2-ethylene ketal.

*Example 10.—5β-acetyl-A-norandrostane-2,17-dione*

Following the procedure in Example 9 but substituting 5β-acetyl-A-norandrostane-2-one-17β-ol for 5β - acetyl-A-norandrostane-2-one-17β-ol 2-ethylene ketal there is obtained 5β-acetyl-A-norandrostane-2,17-dione.

Following the procedures of Examples 1 through 10, but substituting ethyllithium for the methyllithium, the following products are obtained, respectively: 5β-propionyl-17α-ethyl-A-norandrostane-2-one-17β-ol 2 - ethylene ketal; 5β-propionyl-A-norandrostane-2-one-17β - ol 2 - ethylene ketal; 5β-propionyl-17α-ethyl-A-norandrostane - 2 - one-17β-ol; 5β-propionyl-A-norandrostane-2-one-17β - ol; 5β-propionyl-17α-ethyl-A-norandrostane-2-one-17β-ol 2 - ethylene ketal 17-acetate; 5β-propionyl-17α-ethyl-A-norandrostane-2-one-17β-ol 17-acetate; 5β - propionyl-A-norandrostane-2-one-17β-ol 2-ethylene ketal 17-acetate; 5β-propionyl-A-norandrostane-2-one-17β-ol 17-acetate; 5β - propionyl-A-norandrostane-2,17-dione 2-ethylene ketal; and 5β-propionyl-A-norandrostane-2,17-dione. Similarly, other (lower alkyl)lithiums yield the correspondingly substituted products.

Moreover, by following the procedures of Examples 5 through 8, but substituting other acylating agents for the acetic anhydride, the corresponding 17-esters are formed. Thus, propionic anhydride yields the 17α-propionate and benzoyl chloride yields the 17α-benzoate.

This invention may be variously otherwise embodied within the scope of the appended claims.

What is claimed is:

1. A compound of the formula

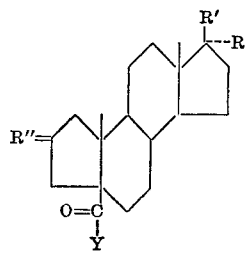

wherein Y is lower alkyl; R is selected from the group consisting of hydrogen and lower alkyl; R″ is selected from the group consisting of ethylenedioxy and propylenedioxy; R′ is selected from the group consisting of hydroxy and the acyloxy radical of a hydrocarbon carboxylic acid of less than twelve carbon atoms; and together R and R′ is keto.

2. The compound of claim 1 having the name 5β-acetyl-17α-methyl-A-norandrostane-2-one - 17β - ol 2 - ethylene ketal.

3. The compound of claim 1 having the name 5β-acetyl-A-norandrostane-2-one-17β-ol 2-ethylene ketal.

4. The compound of claim 1 having the name 5β-acetyl-17α-methyl-A-norandrostane-2-one-17β-ol 2-ethylene ketal 17-acetate.

5. The compound of claim 1 having the name 5β-acetyl-A-norandrostane-2-one-17β-ol 2-ethylene ketal 17-acetate.

6. The compound of claim 1 having the name 5β-acetyl-A-norandrostane-2,17-dione 2-ethylene ketal.

References Cited

UNITED STATES PATENTS 3,271,390   9/1963   Fried _____ 260—340.9 X

ALEX MAZEL, *Primary Examiner.*

J. H. TURNIPSEED, *Assistant Examiner.*